Dec. 14, 1948.                    R. J. MOYLE                    2,456,528
              STATIONARY CUTTER WITH ROTARY DRUM FEED
                FOR CUTTING SUGAR CANE INTO SEED LENGTHS
Filed Oct. 16, 1946                                     2 Sheets-Sheet 2
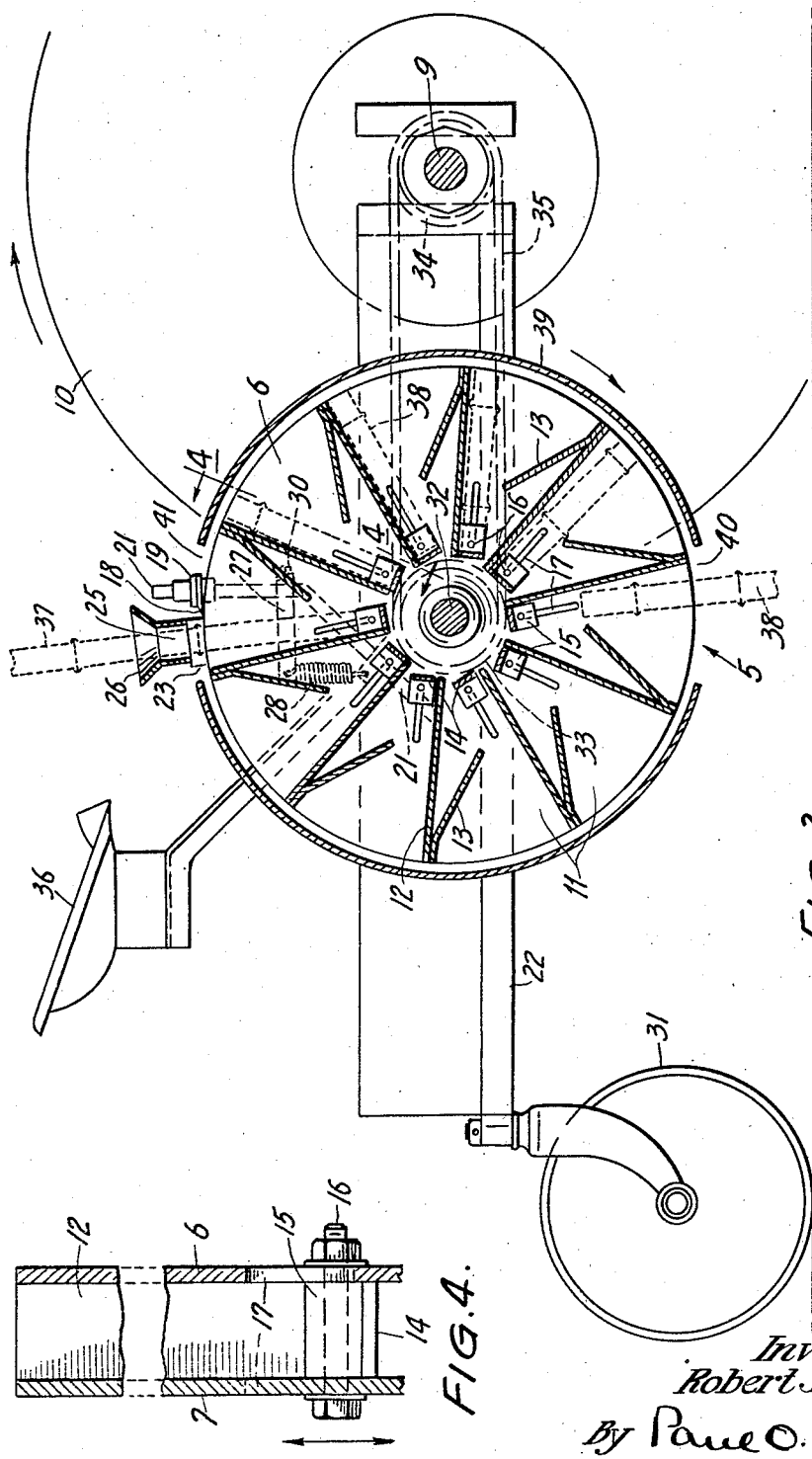
Inventor
Robert J. Moyle
By Paul O. Pippel
Atty.

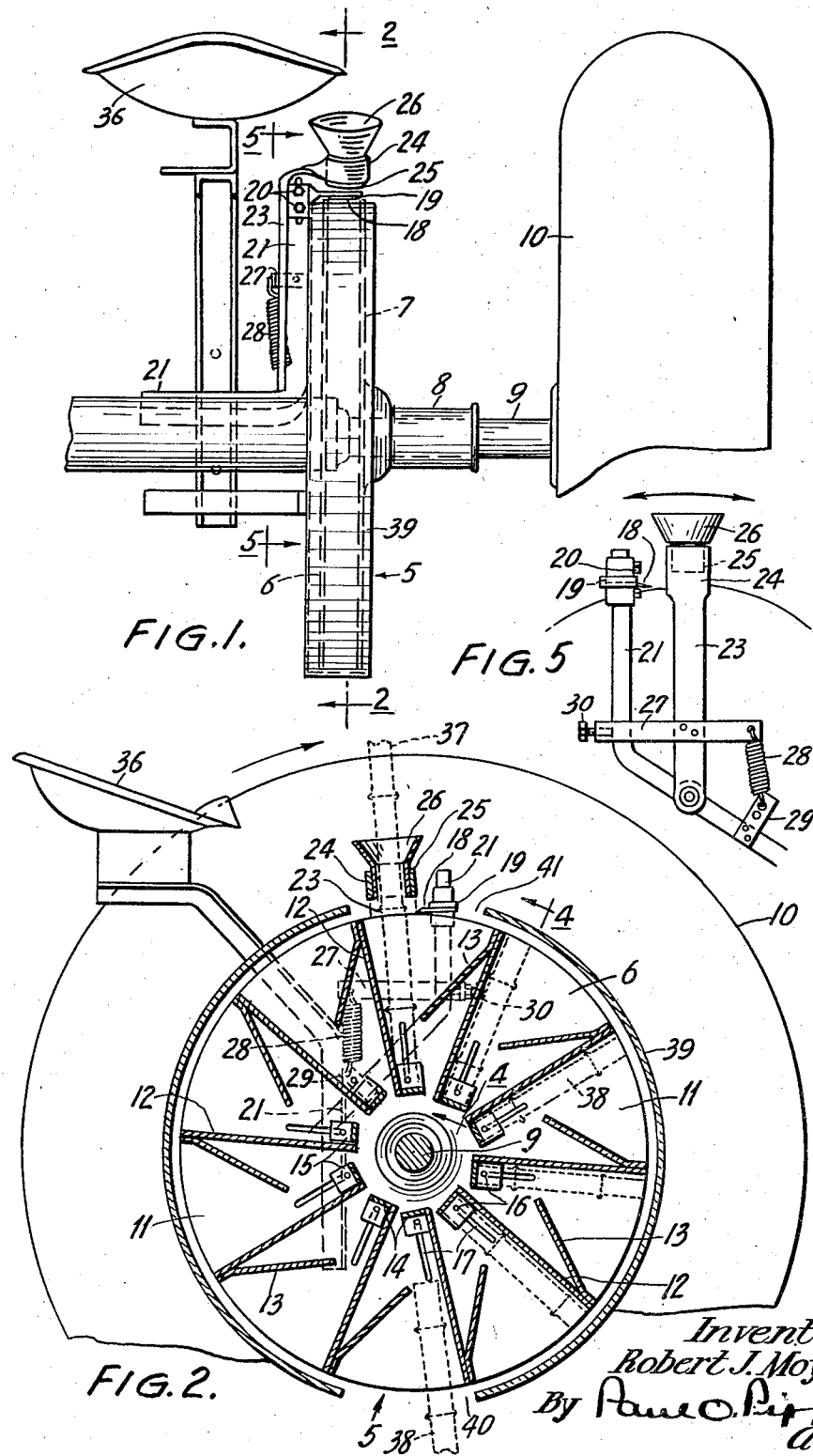

Patented Dec. 14, 1948

2,456,528

UNITED STATES PATENT OFFICE 2,456,528

STATIONARY CUTTER WITH ROTARY DRUM FEED FOR CUTTING SUGAR CANE INTO SEED LENGTHS

Robert Joseph Moyle, Innisfail, Queensland, Australia

Application October 16, 1946, Serial No. 703,597
In Australia April 3, 1945

3 Claims. (Cl. 146—166)

This invention relates to a machine for planting seed-pieces or cuttings in the cultivation of sugar cane, in an effective, expeditious and economical manner.

In the cultivation of sugar cane it is usual to plant the seed-pieces in parallel rows and at spaced distances apart in each row, and in effecting such planting it is customary practice to carry stalks or lengths of cane upon a suitable wheeled transport drawn by a tractive vehicle. An operative who travels on the transport, cuts seed-pieces from the cane and as the vehicle travels, drops them at intervals into the planting furrow.

Obviously, such a method of planting is laborious and being largely dependent on the skill and judgment of the operative results in irregularities in alignment and uneven spacing of the seed-pieces, so that the same are apt to be set too widely apart or too closely together. Moreover, the height through which the seed-pieces are dropped is considerable and is apt to cause inaccurate planting.

Planting machines have been devised whereby the operative is relieved of the work of cutting the cane lengths into seed-pieces for planting, but the determination of the linear dimensions of the pieces and the spacing apart of the same in the furrow still remains dependent upon the judgment and skill of the operative.

Now the principal objective of the present invention is the provision of a planting mechanism of simple construction which may be mounted upon a tractive vehicle or incorporated in a separate implement, whereby cane lengths fed by the operative are automatically cut to form seed-pieces, of equal gauged dimension which are dropped a minimum height and at evenly spaced distances apart into the planting furrow.

In achieving the above-stated principal objective and according to the invention, there is provided in a power driven vehicle or agricultural implement, a planting mechanism for sugar cane comprising a movable member to receive a cane stalk at a charging position, and cutting means to and against which the cane stalk is conveyed by the movable member to sever a seed-piece of predetermined length, said severed seed-piece being carried by the movable member to and discharged at a furrow feeding position. The movable member in carrying a cane stalk from the charging position to the cutting means and the severed seed-piece from the cutting means to the feeding position, may continuously rotate, or oscillate arcually, or reciprocate rectilinearly.

The movable member may comprise a series of compartments to receive the end of a cane stalk in succession at the charging position and carry the same to the cutting means, and then transfer the severed seed-pieces individually to the feeding position. Alternatively, the movable member may comprise a single container which receives the cane stalk at the charging position, carries the stalk to the cutting means and then transfers the severed end to the feeding position and thereafter returns to the charging position.

In a practical arrangement, the movable member rotates continuously and is provided with radial compartments open at the outer ends, and the cutting means comprises a fixed knife which in co-operation with the edge of each compartment severs a portion of the cane stalk inserted therein to form a seed-piece equivalent in length to the distance between the knife and the inner end or base of the compartments. A gauge at the base of each compartment may be radially adjusted to vary the lengths, as may be required, of the seed-pieces cut from the cane stalk.

To retain the seed-pieces in the open compartments as the former are carried from the cutting knife to the feeding position, the rotating member is surrounded by a fixed guard which is spaced concentrically about and closely to but without contact with the periphery of the rotating member and forms a closure for the open compartments. At the feeding position the guard is provided with an opening through which the seed-pieces gravitate from the open compartments in succession into the furrow.

To facilitate the insertion of the cane stalks into the moving compartments by an operative, there is provided a movable guide member which travels with the cane stalk in opposition to a spring whereby upon severance of each seed-piece, the guide is returned to a normal position, the cane stalk meanwhile being retained in the guide for insertion of the cane stalk by the operative into the succeeding compartment for the cutting of the next seed-piece.

The invention will be more readily understood from the following description of the practical arrangement of planting mechanism illustrated in the accompanying drawings wherein:

Fig. 1 is a side elevation of the planting mechanism mounted upon a tractive vehicle and operable by a rotary axle of the latter.

Fig. 2 is a transverse section of the planting mechanism on the line 2—2 in Fig. 1.

Fig. 3 is a sectional view similar to Fig. 2 of the planting mechanism incorporated in a separate implement and operatively connected with an axle of a tractive vehicle towing the implement.

Fig. 4 is a fragmentary sectional detail on a larger scale on the line 4—4 in Figs. 2 and 3.

Fig. 5 is a further fragmentary detail in elevation as indicated by the line 5—5 in Fig. 1.

In these drawings, the numeral 5 designates generally a rotary member or drum having circular discal plates or discs 6 and 7 disposed in parallel relation, the disc 7 being secured to a sleeve 8 fixed to the axle 9 of the tractive wheel 10 of the vehicle to rotate therewith.

The space between the discs 6 and 7 is divided into a number of compartments 11 by substantially radial partitions 12 which extend between and are secured by welding, or otherwise, to the discs 6 and 7.

Also secured to and extending between the discs 6 and 7 are guides 13, the purpose of which will appear hereinafter.

Fixed at the inner ends of the partitions 12 and likewise extending between the discs 6 and 7 are plates 14 which form bases for the compartments 11, and adjoining the plates 14 are gauge blocks 15 which are carried on the bolts 16 extending through radially disposed slots 17 in the discs 6 and 7, see Fig. 4. By releasing the bolts 16, the gauge block 15 may be moved nearer to or further from the periphery of the drum 5 and secured in adjusted position by retightening the bolts 16.

Secured closely to but clear of the periphery of the rotary drum 5 is a knife 18 which is fixed to a mounting plate 19 adjustably secured by clamping screws 20 to a bracket 21 fixed firmly to the tractive vehicle, Fig. 2, or to the frame 22 of the implement, Fig. 3. The adjustable mounting plate 19 enables the knife 18 to be set more or less closely to the periphery of the drum 5, and said plate may be readily removed for the purpose of sharpening or replacing the knife 18.

Pivotally supported on the bracket 21 is an arm 23 substantially radial in relation to the drum 5 and carrying at the outer end 24 a tubular guide 25 having a flared mouth piece or funnel 26 for a purpose referred to hereinafter.

The arm 23 carries a transverse bar 27 which at one end is connected by a spring 28 to a lug 29 fixed to the bracket 21 and at the other end carries an adjustable stop screw 30 which by contact with the bracket maintains the arm 23 and the guide 25 in a normal position under the influence of the spring 28.

Referring now more particularly to Fig. 3, the implement frame 22 at one end is supported by a castor wheel 31 and said frame at the opposite end is concentrically pivoted about the axle 9 of the towing vehicle.

The drum 5 is secured to a shaft 32 rotatably mounted in a bearing fixed to the frame 22 and operatively connected with the rotating axle 9 of the towing vehicle by equal sprockets 33 and 34 connected by a transmission chain 35, whereby the drum 5 revolves at the same speed and in the same direction as the axle 9 and wheel 10 of the towing vehicle.

In operation, the drum 5 shown in Fig. 2 or Fig. 3 rotates in unison with the wheel 10 as the tractive vehicle or the implement travels and the compartments 11 move in succession past the guide 25 and the knife 18.

Lengths or stalks of sugar cane are carried conveniently to an operative sitting upon the seat 36 located adjacently to the planting mechanism, who takes each stalk indicated by 37 in turn and thrusts the same through the guide 25 into a compartment 11 moving past the former, entry of the stalk into the guide being facilitated by the tapered mouth piece 26.

As the stalk passes into the compartment 11, the guide 13 therein directs the stalk towards the advancing partition 12 and upon the gauge block 15 at the base of the compartment.

The partition 12 contacts with the stalk 37 and carries the latter and therewith the guide 25 towards the knife 18.

Upon contact of the stalk with the knife the former is severed between the latter and the edge of the partition 12.

As the guide 25 is moved by the stalk, the stop screw 30 moves away from the bracket 21 and the spring 28 becomes further tensioned and immediately the stalk is severed carries the guide 25 back to the normal position and therewith the end of the stalk which remains in said guide and is delivered by gravity assisted by the operative into the following compartment, whereupon the cutting operation is repeated.

The seed-pieces, indicated by 38, cut from the stalk 37 as described are carried forwardly from the knife 18 in the compartments 11 and are retained thereon by a guard plate or shield 39 concentric with the drum 5.

As the compartments approach the lowest point in the revolution of the drum 5, the seed-pieces 38 fall one by one through an opening 40 in the guard plate 39 into the planting furrow and are spaced therein at even distances apart. Moreover, as the opening 40 is positioned low down, and the drum 5 at its lowest point is moving rearwardly in relation to the forward motion of the vehicle or implement, the seed-pieces 38 are deposited gently and regularly to lie along the bottom of the furrow. At the charging position, the guard plate 39 is provided with an opening 41 of sufficient circumferential extent to provide for movement of the guide 25 and cane stalk 38 during each cutting operation.

A sliding or pivoted door (not shown) may be provided to close the opening 40, if for any reason it is desired to retain the seed-pieces 38 within the compartments, e. g. as when turning upon and traversing headland.

As shown in Figs. 2 and 3, the drum 5 is driven at the same speed, i. e. an equal number of revolutions per minute, as the wheel 10, but it is possible to drive the drum 5 at variable speeds relatively to said wheel by the provision of appropriate gearing, thus for instance, by increasing the size of the sprocket 33 the drum may be driven more slowly than the wheel 10 with the consequence that the seed-pieces are laid in the furrow at wider intervals apart.

In each of the arrangements herein described and illustrated, there is provided a continuously rotating member divided into a plurality of stalk-receiving compartments, but a member having one compartment only may be used, and the member may continuously rotate or said member may oscillate or reciprocate to move the compartment to and fro between the charging and feeding positions.

Moreover, in the above described arrangements, a fixed knife 18 is provided for severing the cane stalks, but a reciprocating knife or a saw may be used if required.

The planting mechanism herein described may obviously be employed for planting other crops than sugar cane wherein the growth or strike originates from seed-pieces or cuttings which may be cut from stalks to gauged lengths and fed to a planting furrow.

I claim:

1. In an agriculture implement, a planting mechanism for sugar cane and the like comprising a rotary member having a horizontal axis, radially extending compartments formed in the member each adapted to receive a cane stalk upon rotation of the member to a charging position, means for rotating the member, a stationary cutting blade located parallel to the axis of the rotary member adjacent the periphery of the same in a position to sever the cane stalk as it is carried thereagainst during rotation of the member, movable guide means adjacent the periphery of the rotary member and spaced radially beyond the cutting blade arranged to direct successive lengths of the cane stalk into successive compartments during rotation of the member, spring means biasing said guide means toward normal operating position, and means for supporting said guide means for movement by the portion of the cane in the respective compartments against spring bias from a normal operating position in the front of the cutting blade toward the cutting blade to accommodate severance of the cane stalk and to return the guide means to normal operating position upon severance.

2. In an agricultural implement, a planting mechanism for sugar cane and the like comprising a rotary member having a horizontal axis, radially extending compartments formed in the member each adapted to receive a cane stalk upon rotation of the member to a charging position, means for rotating the member, a stationary cutting blade located parallel to the axis of the rotary member adjacent the periphery of the same in a position to sever the cane stalk as it is carried thereagainst during rotation of the member, movable guide means adjacent the periphery of the rotary member and spaced radially beyond the cutting blade arranged to direct successive lengths of the cane stalk into successive compartments during rotation of the member, pivot means supporting said guide means for movement by the portion of the cane in the respective compartments from a normal operating position in front of the cutting blade toward the cutting blade to accommodate severance of the cane stalk in the compartment from the portion remaining in the guide means, and spring means biasing said guide means to return to its normal operating position to permit feeding a succeeding length of cane to a succeeding compartment.

3. In an agricultural implement, a planting mechanism for sugar cane and the like comprising a rotary member having a horizontal axis, radially extending compartments formed in the member each adapted to receive a cane stalk upon rotation of the member to a charging position, means for rotating the member, a stationary cutting blade located parallel to the axis of the rotary member adjacent the periphery of the same in a position to sever the cane stalk as it is carried thereagainst during rotation of the member, movable guide means adjacent the periphery of the rotary member and spaced radially beyond the cutting blade arranged to direct successive lengths of the cane stalk into successive compartments during rotation of the member, pivot means supporting said guide means for movement by the portion of the cane in the respective compartments from a normal operating position in front of the cutting blade toward the cutting blade to accommodate severance of the cane stalk in the compartment from the portion remaining in the guide means, spring means biasing said guide means to return to its normal operating position to permit feeding a succeeding length of cane to a succeeding compartment, and an adjusting gauge in each compartment remote from the cutter to vary the length of the severed stalk.

ROBERT JOSEPH MOYLE.

REFERENCES CITED

The following references are of record in the file of this patent:

UNITED STATES PATENTS

| Number | Name | Date |
|---|---|---|
| 358,188 | Davidson | Feb. 22, 1887 |
| 513,807 | Martinez | Jan. 30, 1894 |
| 667,386 | Coats | Feb. 5, 1901 |
| 1,058,116 | Thompson | Apr. 8, 1913 |
| 1,726,139 | Blasco et al. | Aug. 27, 1929 |
| 1,897,664 | Hansen | Feb. 14, 1933 |

FOREIGN PATENTS

| Number | Country | Date |
|---|---|---|
| 100,757 | Australia | Apr. 8, 1937 |
| 107,415 | Australia | May 25, 1939 |